United States Patent Office 3,570,333
Patented Mar. 16, 1971

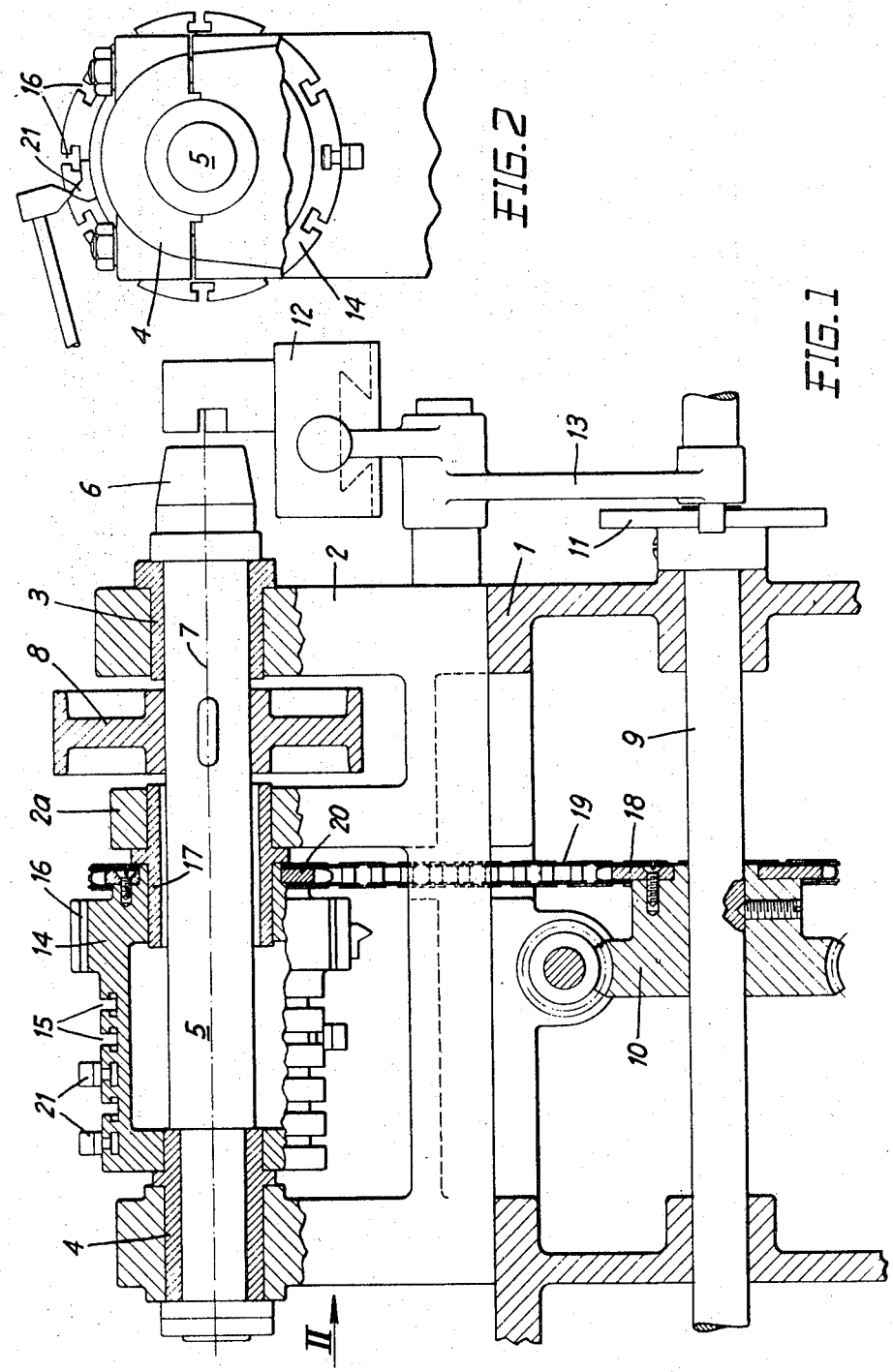

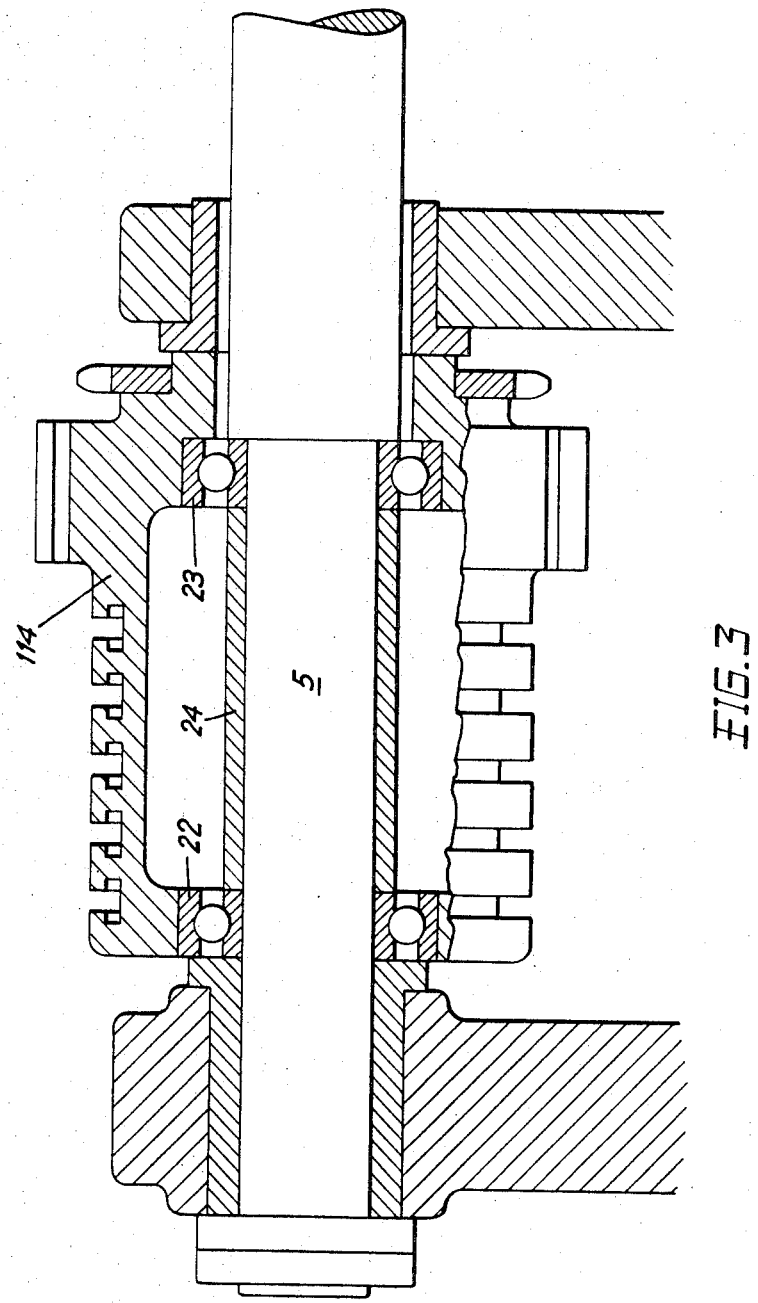

3,570,333
AUTOMATIC LATHE
André Bechler, 4 Rue Centrale, Moutier,
Berne, Switzerland
Filed Apr. 1, 1969, Ser. No. 811,773
Claims priority, application Switzerland, Apr. 10, 1968,
5,305/68
Int. Cl. B23b *3/00, 3/28, 19/02*
U.S. Cl. 82—2                                 5 Claims

ABSTRACT OF THE DISCLOSURE

A drum with grooves in which dogs serving to control sequential functions of the lathe are removably secured, is rotatably mounted on, and coaxially with respect to, the work spindle by two spaced bearings that surround this spindle. The drum is rotated through a transmission arrangement by the camshaft.

BACKGROUND OF THE INVENTION

The invention relates to an automatic lathe having a headstock, a work spindle carried by the headstock, a camshaft located at a distance of the headstock, at least one cam plate held on the camshaft for controlling sequential movements of some parts of the lathe, a drum having at least one circumferential groove and/or a longitudinal groove, and at least one control dog removably and adjustably fixed in the groove or grooves of such drum and serving to control sequential movements or functions of other parts of the lathe.

In known lathes of this general kind said drum is fixed on the camshaft coaxially thereto; and in other designs such drum is arranged behind the headstock, additional parts being then required for its rotatable support.

SUMMARY OF THE INVENTION

An object of the invention is to improve the construction of automatic lathes of the above mentioned kind with a view to render said drum with its control dogs more accessible, to facilitate setting-up of the lathe and also to render the whole construction more compact.

This object and others of the invention will be apparent from the following detailed description.

BRIEF DESCRIPTION OF THE DRAWINGS

The invention will be described, with reference to the figures of accompanying drawings, wherein an embodiment of the invention and a modification of part of same are illustrated in simplified form, all unessential parts being eliminated:

FIG. 1 is an elevation view, partly cut away, of the said embodiment of the invention;

FIG. 2 is a side elevation taken in the direction of the arrow II of FIG. 1, and FIG. 3 is a longitudinal section of part of a modification.

DESCRIPTION OF THE PREFERRED EMBODIMENTS

With reference to FIGS. 1 and 2, there is shown the bed 1 of an automatic lathe. A headstock 2 which is fixed on the bed by means not shown and which is substantially longer than those of customary lathes, has a front bearing 3 and a rear bearing 4 for a work spindle 5 provided on its front end with a chuck 6. The axis of rotation of the spindle 5 is denoted with the reference numeral 7. The rotational drive is transmitted to this spindle 5 through a belt drive arrangement of which is shown only the pulley 8 fixed on the spindle 5.

The lathe further incorporates the customary camshaft 9, which is driven from the spindle 5 by a transmission device including a worm gear box in which a worm meshes with a worm gear 10 secured to the camshaft 9. To this camshaft is also secured at least one cam plate 11 serving to control, in the usual way, sequential movement of movable component of the lathe. Merely for the purpose of illustration, the cam plate 11 in FIG. 2 is shown to control the reciprocatory movements of a tool-holding slide 12 by means of a transmission lever 13. As is well known to those skilled in the art, there are many different components which may be controlled in some similar way by such a cam plate 11.

As remarked at the beginning, it is already well known to provide an an automatic lathe a drum having at least one longitudinal groove and/or a circumferential groove in which a control dog is removably and adjustably fixed. The dogs used control levers, hydraulic parts, electrical contactors, and such like components for controlling part of the sequence of operation of the lathe. In known lathes the drum of this kind is mounted at one or another place, such as on the camshaft, above the headstock or behind the latter. In accordance with the invention, the drum is mounted coaxially with the work spindle 5 within the headstock 2. The drum of the embodiment illustrated in FIGS. 1 and 2 is denoted with the reference numeral 114; its circumferetnial grooves are denoted with 15 and its spaced longitudinal grooves, or slots, are denoted with 16. The rear of the drum is rotatably mounted on the outer circumference of the bearing 4 and the front of this drum is rotatably mounted on the rear part of a bearing 17 coaxial to the bearings 3 and 4 and secured in a projection 2a of the headstock. The drum 14 turns about the same axis 7 as does the work spindle 5. In the example of FIGS. 1 and 2 the drive of the drum 14 is derived from the camshaft 9 and transmitted through a certain drive 18, 19, 20. In a modification (not shown) the drive of the drum may derive from the work spindle 5 through a suitable transmission arrangement, e.g. a reversible one which includes clutches. Such transmissions are known in a great variety and will not be further explained. Nor will there be explained the larger number of functions which may be controlled by the dogs removably and adjustably secured in the grooves 15 and the slots 16. Two such dogs 21 are shown, each one set in one of the peripheral grooves 15.

FIG. 3 shows a modification of the bearing support for the dog-carrying drum which is here denoted with the reference numeral 114. Two ball bearings 22 and 23 are provided, held apart by a spacer 24, which bearings mount the drum directly on the work spindle 5 and free to rotate about the same axis as this spindle and independently of same.

Although the preferred embodiments of the invention have been described, the scope of, and the breadth of protection afforded to, the invention are limited solely by the appended claims.

What I claim is:

1. An automatic lathe having a headstock, a work spindle carried by said headstock, a camshaft, at least one cam plate held on said camshaft and serving to control the sequential movements of movable components of the lathe, a drum having at least one groove in the periphery thereof, control dogs removably and adjustably each secured in such a groove and serving to control other sequential movements and functions of other parts of the lathe, and wherein the improvement comprises means for rotatably mounting said drum coaxially with respect to said work spindle and within said headstock, and transmission means for driving said drum from a driven element of said lathe.

2. The lathe as defined in claim 1, wherein said transmission means is connectable and disconnectable.

3. The lathe as defined in claim 1, wherein said transmission means drivingly connects said drum to said camshaft.

4. The lathe as defined in claim 1, wherein said means for mounting said drum comprises two spaced bearings surrounding, and coaxial with respect to, said work spindle.

5. The lathe as defined in claim 4, wherein each said bearing is a ball bearing mounted directly on said work spindle.

References Cited

UNITED STATES PATENTS

| | | | |
|---|---|---|---|
| 2,127,023 | 8/1938 | Falk | 82—29 |
| 2,319,741 | 5/1943 | Lovely et al. | 82—2 |
| 2,359,255 | 9/1944 | Smith | 82—28X |
| 2,408,841 | 10/1946 | Fritzsch | 82—29 |
| 2,871,882 | 2/1959 | Eliasson | 82—29X |

HARRISON L. HINSON, Primary Examiner

U.S. Cl. X.R.

82—18, 28

PO-1050
(5/69)

UNITED STATES PATENT OFFICE
CERTIFICATE OF CORRECTION

Patent No. 3,570,333      Dated March 16, 1971

Inventor(s) André Bechler

It is certified that error appears in the above-identified patent and that said Letters Patent are hereby corrected as shown below:

Column 2, line 33, reference numeral "114" should be reference numeral --14--

Column 2, line 43, "certain" should be --chain--

Signed and sealed this 22nd day of June 1971.

(SEAL)
Attest:

EDWARD M. FLETCHER, JR.       WILLIAM E. SCHUYLER, J
Attesting Officer      Commissioner of Patent